(12) United States Patent
Ma

(10) Patent No.: US 9,534,798 B2
(45) Date of Patent: Jan. 3, 2017

(54) COUPLED AIR-CONDITIONING DEVICE

(71) Applicant: Jun Ma, Guangzhou (CN)

(72) Inventor: Jun Ma, Guangzhou (CN)

( * ) Notice: Subject to any disclaimer, the term of this patent is extended or adjusted under 35 U.S.C. 154(b) by 524 days.

(21) Appl. No.: 14/187,358

(22) Filed: Feb. 24, 2014

(65) Prior Publication Data

US 2014/0165637 A1   Jun. 19, 2014

Related U.S. Application Data

(63) Continuation-in-part of application No. PCT/CN2012/000794, filed on Jun. 11, 2012.

(30) Foreign Application Priority Data

| Aug. 25, 2011 | (CN) | 2011 1 0246146 |
| Nov. 14, 2011 | (CN) | 2011 1 0359277 |
| Feb. 29, 2012 | (CN) | 2012 1 0048974 |
| May 3, 2012 | (CN) | 2012 1 0133907 |

(51) Int. Cl.
| F24F 3/14 | (2006.01) |
| F24F 3/147 | (2006.01) |
| F24F 5/00 | (2006.01) |
| B01D 53/06 | (2006.01) |
| B01D 53/26 | (2006.01) |

(52) U.S. Cl.
CPC .............. *F24F 3/1423* (2013.01); *B01D 53/06* (2013.01); *B01D 53/261* (2013.01); *F24F 3/147* (2013.01); *F24F 5/0021* (2013.01); *Y02E 60/147* (2013.01)

(58) Field of Classification Search
CPC ........ F24F 3/1423; F24F 3/147; F24F 5/0021; B01D 53/06; B01D 53/261; Y02E 60/147

IPC ................................ F24F 3/1423,3/147, 5/0021
See application file for complete search history.

(56) References Cited

U.S. PATENT DOCUMENTS

| 2008/0276640 A1* | 11/2008 | Bhatti | F24F 3/1423 62/271 |
| 2009/0139254 A1* | 6/2009 | Landry | B01D 5/0033 62/271 |
| 2010/0077783 A1* | 4/2010 | Bhatti | F24F 3/1423 62/271 |
| 2010/0132379 A1* | 6/2010 | Wu | F24F 3/1423 62/3.2 |

* cited by examiner

*Primary Examiner* — Marc Norman
(74) *Attorney, Agent, or Firm* — Matthias Scholl, PC; Matthias Scholl

(57) ABSTRACT

A coupled air-conditioning device including a dehumidification system and a vapor compression-type refrigeration system which are connected through a pipeline. The vapor compression-type refrigeration system is a closed circuit including an evaporator, a compressor, a condenser and an expansion valve. The dehumidification system includes a desiccant-wheel with a regeneration area and a processing area, a processing air blower, a regeneration air blower and an electric motor driving the desiccant-wheel to rotate. The processing air blower and the regeneration air blower are provided with an exhaust port. The condenser includes a phase-change condensation heat exchanger and a refrigerant gas cooler. The refrigerant gas cooler operates to cool the overheated refrigerant discharged from the compressor into a saturated refrigerant in gas state, employing a structural form of a tube-fin heat exchanger comprising a heat exchange tube and a fin piece.

15 Claims, 7 Drawing Sheets

COUPLED AIR-CONDITIONING DEVICE

CROSS-REFERENCE TO RELATED APPLICATIONS

This application is a continuation-in-part of International Patent Application No. PCT/CN2012/000794 with an international filing date of Jun. 11, 2012, designating the United States, now pending, and further claims priority benefits to Chinese Patent Application No. 201110246146.0 filed Aug. 25, 2011, to Chinese Patent Application No. 201110359277.x filed Nov. 14, 2011, to Chinese Patent Application No. 201210048974.8 filed Feb. 29, 2012, and to Chinese Patent Application No. 201210133907.6 filed May 3, 2012. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

Field of the Invention

The invention relates to a refrigeration air conditioner, and more particularly to a vapor compression-type refrigeration & desiccant-wheel dehumidification coupled air conditioning device.

Description of the Related Art

The load of an air conditioning device includes latent heat load and sensible heat load, and the latent heat accounts for 20-40% of the total load of the air conditioning device. The traditional air conditioning device includes an evaporator, a compressor, a condenser, an expansion valve and a refrigerant. The evaporator decreases air temperature while the moisture in the air is also condensed, thus realizing simultaneous removing of the latent heat and sensible heat. In such case, the power consumption of the compressor is high while the refrigeration efficiency of a vapor compression-type refrigeration system is low. In the meanwhile, the condenser emits a lot of heat. Generally, the hot air is directly discharged to the atmosphere.

SUMMARY OF THE INVENTION

In view of the above-described problems, it is one objective of the invention to provide a vapor compression-type refrigeration & desiccant-wheel dehumidification coupled air-conditioning device. The coupled device of the invention is characterized in that: The vapor compression-type refrigeration system can produce hot air with the temperature of over 70° C., and the hot air can be directly used to regenerate desiccant wheel.

The further objective of the invention is to facilitate latent load and sensible load to be operated separately. A vapor compression-type refrigeration system is not needed to be responsible for removing the moisture from air. Therefore, the vapor compression-type refrigeration system saves the energy consumption for moisture remove. Meanwhile, the evaporation temperature of refrigeration in coupled system can be much higher than the evaporation temperature in a normal vapor compression-type refrigeration system so the refrigeration efficiency can be about 30% higher than that of the common vapor compression-type refrigeration system.

To achieve the above objectives, in accordance with one embodiment of the invention, there is provided a coupled air-conditioning device comprising a dehumidification system and a vapor compression-type refrigeration system which are connected through a pipeline. The vapor compression-type refrigeration system is a closed circuit comprising an evaporator, a compressor, a condenser and an expansion valve. The dehumidification system comprises a desiccant-wheel with a regeneration area and a processing area, a processing air blower, a regeneration air blower and an electric motor driving the desiccant-wheel to rotate. The processing air blower and the regeneration air blower are provided with an exhaust port; the condenser comprises a phase-change condensation heat exchanger and a refrigerant gas cooler; the refrigerant gas cooler operates to cool the overheated refrigerant discharged from the compressor into a saturated refrigerant in gas state, employing a structural form of a tube-fin heat exchanger comprising a heat exchange tube and a fin piece; the refrigerant flows in the tube while the air cooling the refrigerant flows outside of the tube; the temperature of the heated air is higher than the saturated condensation temperature of the refrigerant of the refrigeration system; the phase-change condensation heat exchanger is mainly responsible for condensation the refrigerant from gas state to liquid state; the refrigerant, after being completely condensed in the heat exchanger, is further cooled to be under overcooled state; and all the energy for the regeneration of the desiccant-wheel comes from the energy released during vapor compression refrigeration process.

In a class of this embodiment, the dehumidification system also comprises a front regeneration air blower. The air needed to be processed is successively connected to the evaporator, the processing area and the processing air blower. Regeneration air is successively connected to the front regeneration air blower, the phase-change condensation heat exchanger, the refrigerant gas cooler, the regeneration area and the regeneration air blower. The exhaust port is provided between the phase-change condensation heat exchanger and the refrigerant gas cooler. The vapor evaporator may also be positioned between the processing area and the processing air blower. The air needed to be processed is successively connected to the processing area, the evaporator and the processing air blower.

In a class of this embodiment, the flow rate of the front regeneration air blower is larger than that of the regeneration air blower. The heat-exchange area of the phase-change condensation heat exchanger is larger than that of the refrigerant gas cooler. The air flow rate of the front regeneration air blower is adjusted and controlled by a temperature measurement and controlling device. The front regeneration air blower facilitates the air to flow through the phase-change condensation heat exchanger, and then a portion of the air is regarded as waste hot air and discharged from the exhaust port between the phase-change condensation heat exchanger and the refrigerant gas cooler to the atmosphere. The regeneration air blower facilitates a portion of the air heated by the phase-change condensation heat exchanger to continuously flow through the refrigerant gas cooler to be heated further, thus obtaining high-temperature air.

The temperature measurement and controlling device is used for controlling the air flow rate of the front air blower. When the measured temperature is lower than the set value, the flow speed of the front air blower, through the adjustment of the frequency or the voltage of the front air blower, is facilitated to be lowered.

In order to facilitate the regeneration temperature to be higher and facilitate the overall system to have better operation efficiency, the vapor compression-type refrigeration system has two sets and comprises a main compression refrigeration system and a sub compression refrigeration system. The exhaust port is provided between a main overcooled heat exchanger and a sub refrigerant gas cooler.

In a class of this embodiment, the air needed to be processed is successively connected to a sub evaporator, the processing area, a main evaporator and the processing air blower. The regeneration air e is successively connected to the front regeneration air blower, a sub phase-change condensation heat exchanger, a main phase-change condensation heat exchanger, the sub refrigerant gas cooler, a main refrigerant gas cooler, the regeneration area and the regeneration air blower.

In a class of this embodiment, the air needed to be processed is successively connected to the sub evaporator, the processing area and the processing air blower. The regeneration air e is successively connected to the front regeneration air blower, the sub phase-change condensation heat exchanger, the main phase-change condensation heat exchanger, the sub refrigerant gas cooler, the main refrigerant gas cooler, the regeneration area, the main evaporator and the regeneration air blower.

In a class of this embodiment, the air needed to be processed is successively connected to the processing area, the main evaporator, the sub evaporator and the processing air blower. The regeneration air e is successively connected to the front regeneration air blower, the sub phase-change condensation heat exchanger, the main phase-change condensation heat exchanger, the sub refrigerant gas cooler, the main refrigerant gas cooler, the regeneration area and the regeneration air blower.

In a class of this embodiment, the phase-change condensation heat exchanger may be a water-cooling heat exchanger. The phase-change condensation heat exchanger is a shell-tube type heat exchanger or plate-fin type heat exchanger. One side of the phase-change condensation heat exchanger communicates with the refrigerant and the other side thereof communicates with cooled water. A dehumidification system also comprises the cooler. The air needed to be processed is successively connected to the processing area, the cooler, the evaporator and the processing air blower. The regeneration air e is successively connected to the refrigerant gas cooler, the regeneration area and the regeneration air blower. After the air flows through the processing area, the moisture from the air is absorbed by a desiccant-wheel, and the air becomes dry and is discharged from an exhaust port b of the processing air blower after it successively passes through the cooler, the evaporator and the processing air blower again. After the regeneration air e is heated through the refrigerant gas cooler, its temperature is higher than the saturated condensation temperature of the refrigerant in the refrigeration system. After the hot air flows through the processing area, the moisture absorbed in the desiccant-wheel is taken away by the hot air. The energy for the regeneration of the desiccant-wheel comes from the energy released by the refrigeration system and all the regeneration air is discharged from an exhaust port f to the atmosphere via the regeneration air blower. The absorbing material on the desiccant-wheel recovers absorbing ability.

If the moisture from the air in the atmosphere is relatively high, there are two desiccant wheels and two air the cooler in the system; two desiccant wheels connect in series, each desiccant wheel is driven by a respective electric motor; the air e needed to be processed is successively connected to a processing area Level-1, the cooler Level-1, a processing area Level-2, the cooler Level-2, the evaporator and the processing air blower through the pipeline; the regeneration air e flow through the gas cooler, and then be divided into two parts, one tributary is connected to the regeneration air blower Level-1 after flowing through the regeneration area Level-1, and the other tributary communicates with the regeneration air blower Level-2 after flowing through the regeneration area Level-2.

The invention facilitates the vapor compression-type refrigeration system and the desiccant-wheel to carry out joint operation. The refrigerant is cooled to be under overcooled state, in the meanwhile, hot air with the temperature of over 70° C. be obtained from the refrigeration system and the hot air be used to regenerate the desiccant wheel. With the provided positions of various parts of the refrigeration system and the dehumidification system, the latent heat load and the sensible heat load are separately processed. Because the refrigeration system is not needed to be responsible for removing the moisture from the air, the evaporation temperature of the refrigeration system can be higher than that of the common refrigeration system. When the evaporation temperature of the refrigeration system can be 2-10° C. higher than that of the common refrigeration system, the ratio of the evaporation pressure to the condensation pressure of the vapor compression-type refrigeration system will become lower, the power consumed by the compressor become lower, and the refrigeration efficiency of the vapor compression-type refrigeration system become higher.

The flow rate of the front regeneration air blower is larger than that of the regeneration air blower. The energy produced in condensation process of the common refrigeration is larger than the cooling capacity of the refrigeration process. In order to guarantee the enough high refrigeration efficiency, the air flow rate used for cooling the condenser will more than one time that passing through the evaporator. However, in order the desiccant-wheel works effectively, the air flow rate passing through the processing area is generally more than 3 times that passing through the regeneration area. Specially designed flow chart and distribution of the air flow rate guarantees the refrigeration efficiency of the system and the dehumidification efficiency of the desiccant-wheel reach as high as possible at the same time.

The heat-exchange area of the phase-change condensation heat exchanger is larger than that of the refrigerant gas cooler. The condensation process is basically carried out under the constant pressure condition, but the temperature of the refrigerant changes during the condensation process. All the condensation energy consists of three parts, that is, the energy released when the overheated refrigerant gas cool down to saturated gas, the energy released when the saturated refrigerant in gas state cool down to the saturated refrigerant in liquid state, the energy released when the saturated refrigerant in liquid state cool down to overcooled state. The energy released when the overheated refrigerant gas cool down to saturated gas is only 15-20% of the all the energy released during the condensation process. The energy release when the saturated refrigerant in gas state cool down to the saturated refrigerant in liquid state is about 80-85% of all the energy released during the condensation process.

The temperature measurement and controlling device is used for controlling the air flow rate of the front air blower. In order to guarantee to achieve high temperature, and under the premise that the refrigeration efficiency is not influenced, the temperature of the cooled air is required to be as high as possible after the cooled air passes through the front heat exchanger. However, as the environmental temperature varies continuously, and under the conditions that the environmental temperature is lowered, the cooled air volume shall be lowered in order to achieve high temperature.

Figure 1:
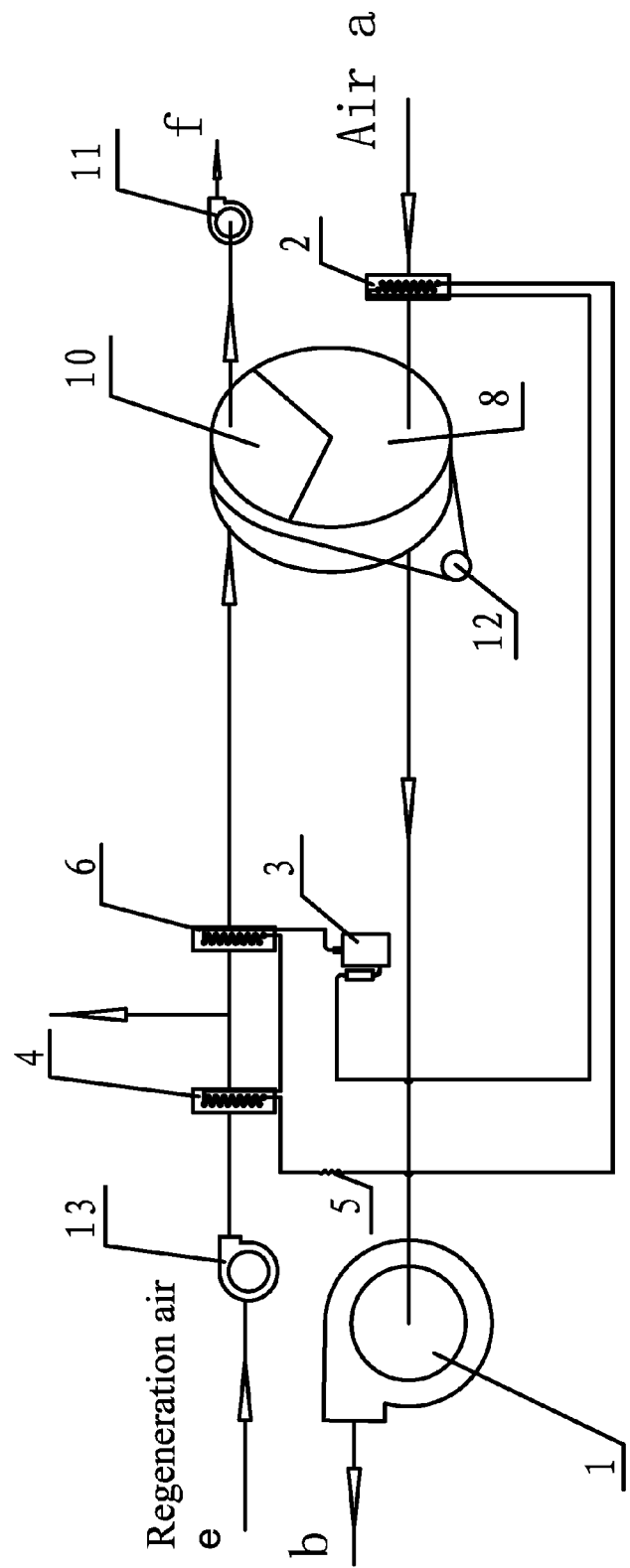
FIG. 1 is a first structural diagram of a coupled air-conditioning device in accordance with one embodiment of the invention.

In the drawings, the following reference numbers are used: 1: Processing Air Blower; 2: Evaporator; 3: Compressor; 4: Phase-change condensation heat exchanger; 5: Expansion Valve; 6: Refrigerant Gas Cooler; 7: Cooler Level-2; 8: Processing area Level-2; 10: Regeneration area Level-2; 11: Regeneration Air Blower Level-2; 12: Electric Motor; 13: Regeneration Air Blower; 14: Cooler Level-1; 17: Regeneration area Level-1; 18: Processing area Level-1; 20: Regeneration Air Blower Level-1; 21: Main Evaporator; 31: Main Compressor; 41: Main Phase-change condensation heat exchanger; 51: Main Expansion Valve; 61: Main Refrigerant Gas Cooler; 22: Sub Evaporator; 32: Sub Compressor; 42: Sub Phase-change condensation heat exchanger; 52: Sub Expansion Valve; 62: Sub Refrigerant Gas Cooler.

DETAILED DESCRIPTION OF THE EMBODIMENTS

For further illustrating the invention, experiments detailing a coupled air-conditioning device are described below. It should be noted that the following examples are intended to describe and not to limit the invention.

The invention provides a coupled air-conditioning device comprising a dehumidification system and a vapor compression-type refrigeration system which are connected through a pipeline.

As shown in FIG. 1, the vapor compression-type refrigeration system is a closed circuit comprising an evaporator 2, a compressor 3, a phase-change condensation heat exchanger 4, a refrigerant gas cooler 6 and an expansion valve 5. The phase-change condensation heat exchanger 4 has the structural form of a tube-fin type heat exchanger comprising a heat exchange tube and a fin piece.

The dehumidification system comprises a desiccant-wheel with a regeneration area 10 and a processing area 8, a processing air blower 1, a front regeneration air blower 13, a regeneration air blower 11, and an electric motor 12 driving desiccant-wheel to rotate.

The refrigerant gas cooler 6 operates to cool the overheated refrigerant discharged from the compressor 3 into a saturated refrigerant in gas state, employing a structural form of a tube-fin heat exchanger comprising the heat exchange tube and the fin piece. The refrigerant flows in the tube while the air cooling the refrigerant flows outside of the tube. The temperature of the heated air is higher than the saturated condensation temperature of the refrigerant of the refrigeration system. The phase-change condensation heat exchanger 4 is mainly responsible for condensation the refrigerant from gas state to liquid state and further cooling the refrigerant to be under overcooled state in the phase-change condensation heat exchanger 4. The energy needed by the regeneration of the desiccant-wheel comes from the energy released during vapor compression-type refrigeration process.

Air a flows through the evaporator 2 and then successively passes through the processing area 8 and the processing air blower 1. Regeneration air e is discharged from an exhaust port f to the atmosphere after passing through the front regeneration air blower 13, the phase-change condensation heat exchanger 4, the refrigerant air cooler 6, the regeneration area 10 and the regeneration air blower 11. The exhaust port is provided between the phase-change condensation heat exchanger 4 and the refrigerant gas cooler 6.

Figure 2:
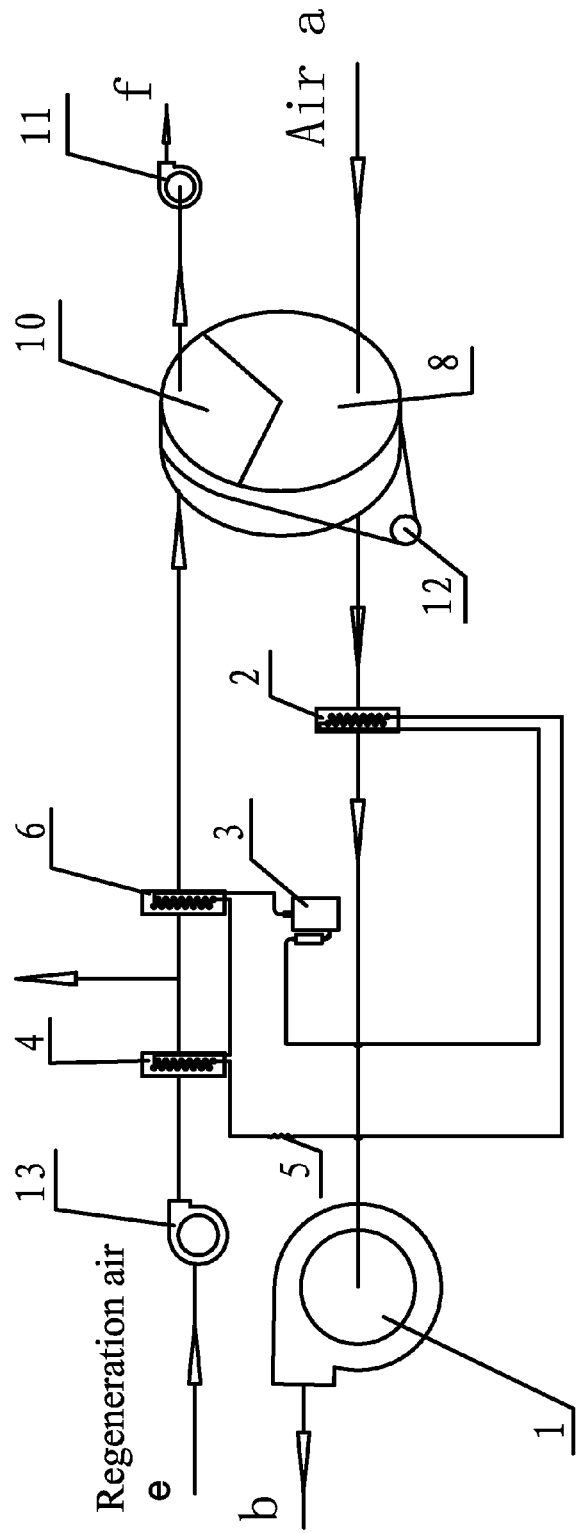
FIG. 2 is a second structural diagram of a coupled air-conditioning device in accordance with one embodiment of the invention.

As shown in FIG. 2, and based on FIG. 1, the evaporator 2 is adjusted to be between the processing area 8 and the processing air blower 1. The air a flows through the processing area 8 and is discharged from an exhaust port b of the processing air blower 1 after it successively passes through the evaporator 2 and the processing air blower 1 again.

Figure 3:
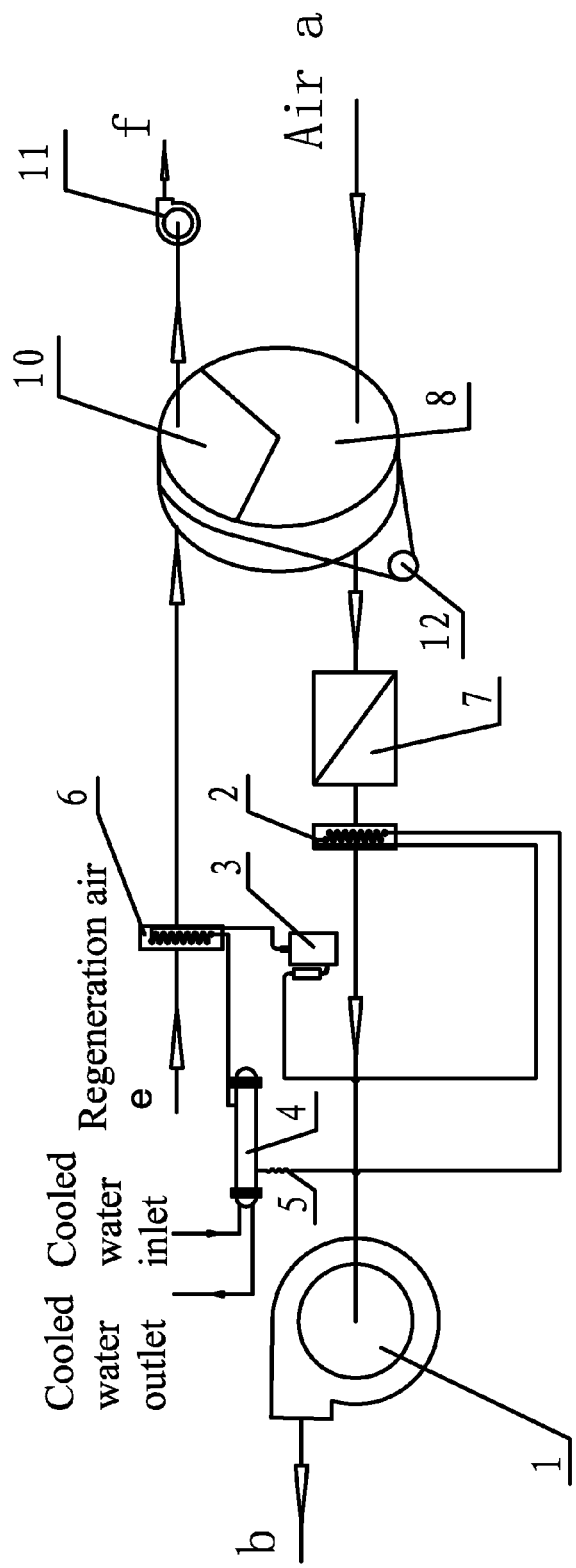
FIG. 3 is a third structural diagram of a coupled air-conditioning device in accordance with one embodiment of the invention.

As shown in FIG. 3, the phase-change condensation heat exchanger 4 is the shell-tube type heat exchanger or plate-fin type heat exchanger. One side of the phase-change condensation heat exchanger 4 communicates with the refrigerant and the other side thereof communicates with cooled water.

The dehumidification system comprises the desiccant wheel with the regeneration area 10 and the processing area 8, the processing air blower 1, the cooler 7, the regeneration air blower 11, and the electric motor 12 driving the desiccant wheel to rotate.

The air a flows through the processing area 8 and is discharged from the exhaust port b after it successively passes through the cooler 7, the evaporator 2 and the processing air blower 1. The regeneration air e is discharged from the exhaust port f to the atmosphere after passing through the refrigerant gas cooler 6, the regeneration area 10 and the regeneration air blower 11.

Figure 4:
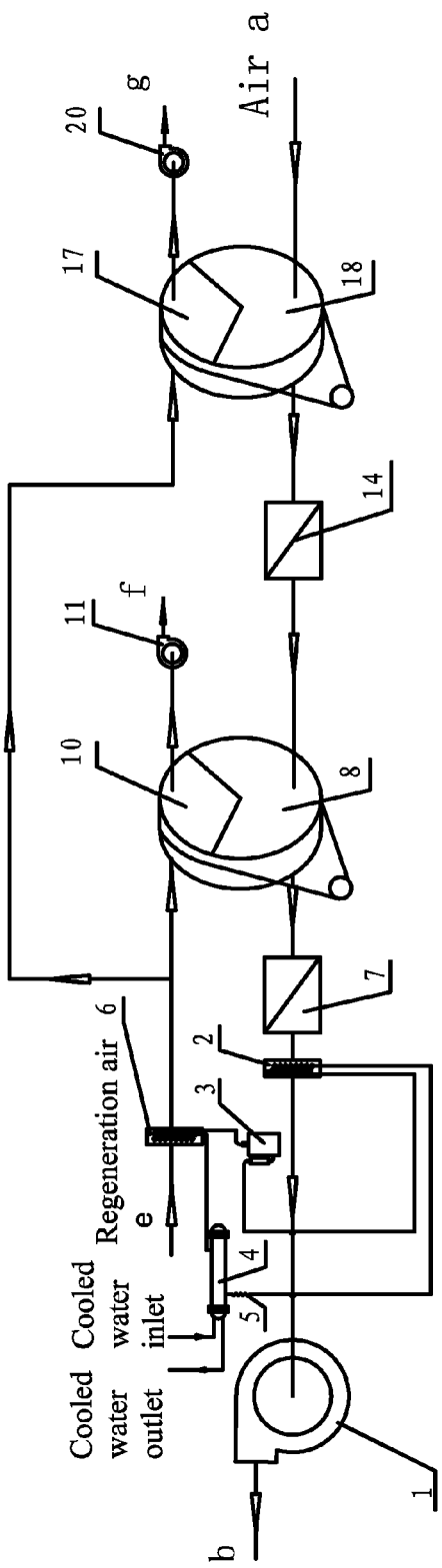
FIG. 4 is a fourth structural diagram of a coupled air-conditioning device based on FIG. 3.

When the moisture from the air a is relatively high, another set of the desiccant wheel and the cooler are added based on the FIG. 3 of the invention. As shown in FIG. 4, the dehumidification system comprises a desiccant wheel Level-1, a desiccant wheel Level-2, the processing air blower 1, a regeneration area Level-1 17, a cooler Level-1 14, a regeneration air blower Level-2 11, a cooler level-2 and the electric motor. The air a is discharged from the exhaust port b after it successively flows through the processing area Level-1 18, the cooler Level-1 14, the processing area Level-2, the cooler Level-2 7, the evaporator 2 and the processing air blower 1. The regeneration air e is shunted after being heated by the refrigerant gas cooler 6. One tributary is discharged from an exhaust port g to the atmosphere after flowing through the regeneration area Level-1 17 and the regeneration air blower Level-1 20, and the other tributary is discharged from the exhaust port f to the atmosphere after flowing through the regeneration area Level-2 and the regeneration air blower Level-2.

In order to facilitate the regeneration temperature to be higher and facilitate the overall system to have better operation efficiency, the vapor compression-type refrigeration system can be two sets and comprises a main compression refrigeration system and a sub compression refrigeration system. The exhaust port is provided between a main phase-change condensation heat exchanger 41 and a sub refrigerant gas cooler 62.

Figure 5:
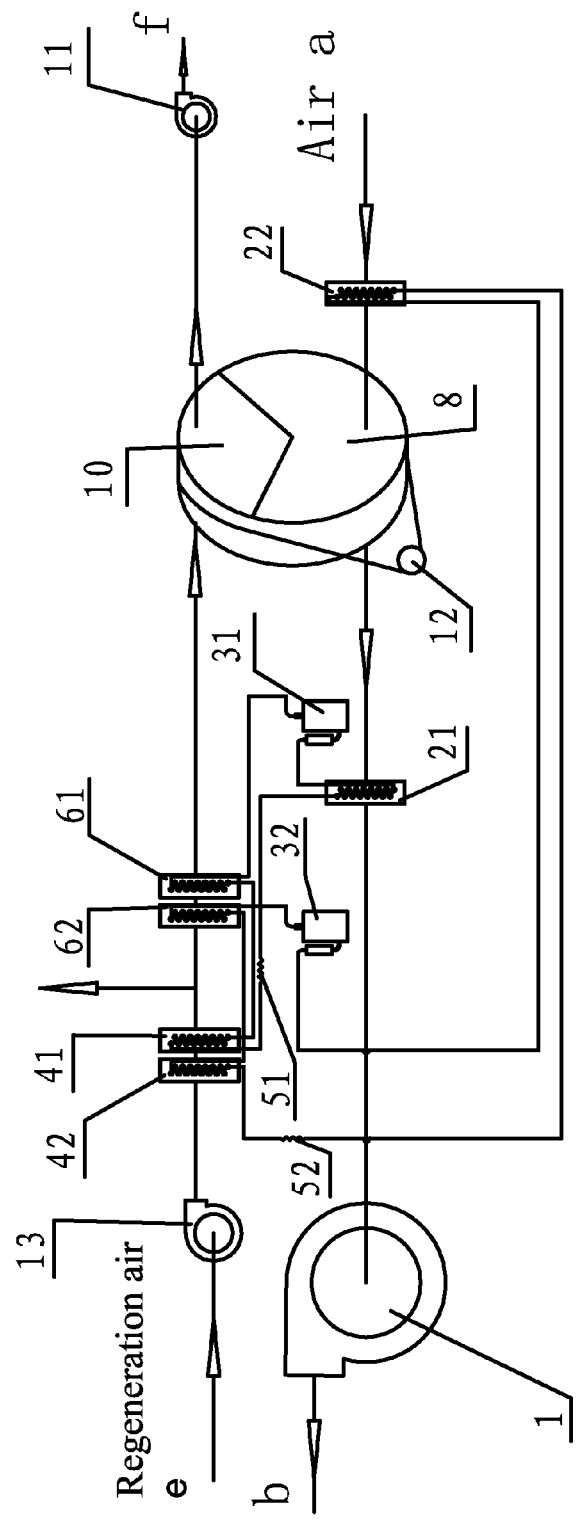
FIG. 5 is a fifth structural diagram of a coupled air-conditioning device based on FIG. 1.

As shown in FIG. 5, the air a is discharged from the exhaust port b after it is successively connected to the evaporator 22, the processing area 8, the main evaporator 21 and the processing air blower 1 through the pipeline. The regeneration air e is discharged from the exhaust port f to the atmosphere after it is successively connected to the front regeneration air blower 13, a sub phase-change condensation heat exchanger 42, a main phase-change condensation heat exchanger 41, the sub refrigerant gas cooler 62, a main refrigerant gas cooler 61, the regeneration area 10 and the regeneration air blower 11.

Figure 6:
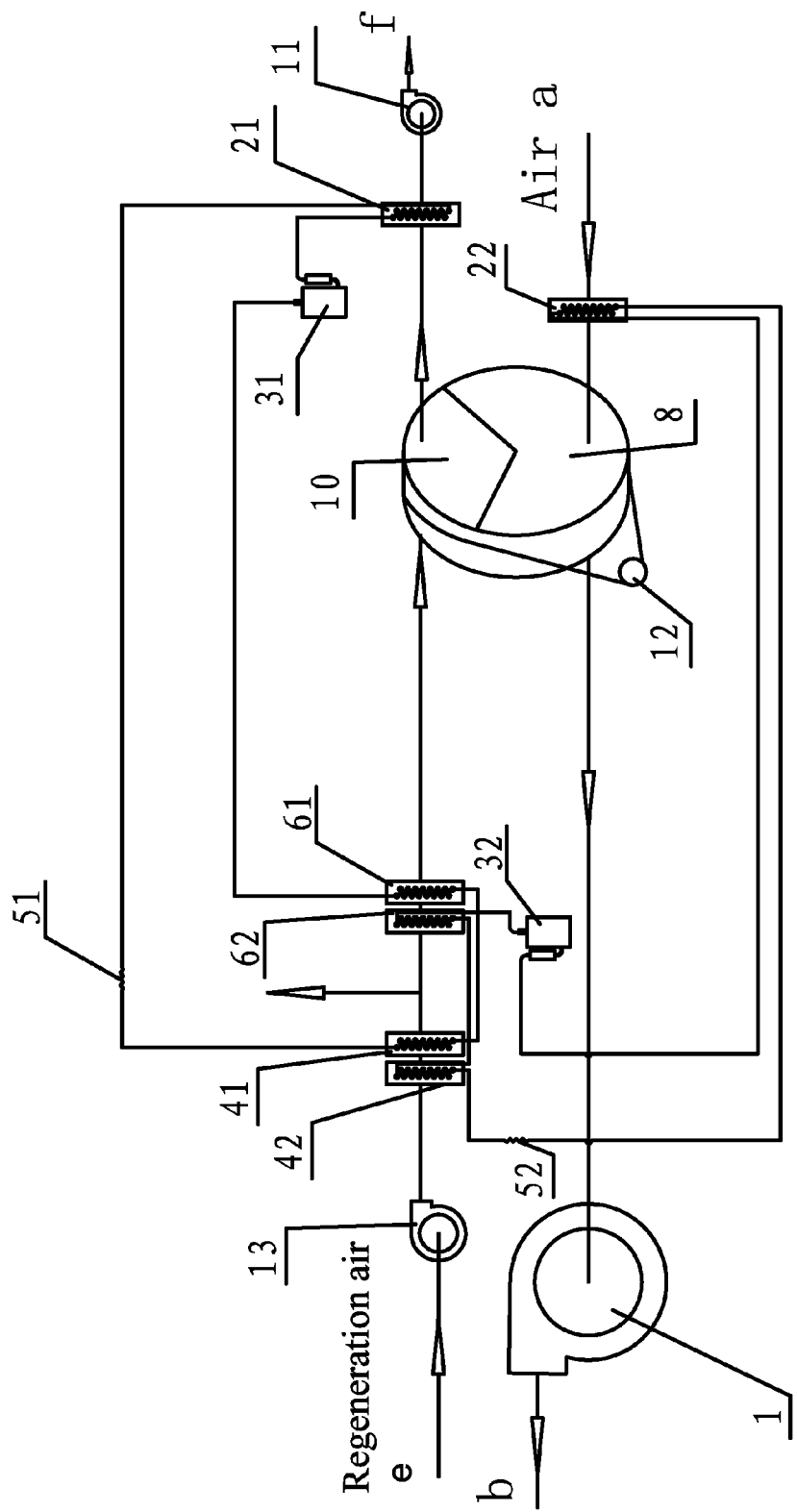
FIG. 6 is a sixth structural diagram of a coupled air-conditioning device based on FIG. 1.

As shown in FIG. 6, the air a is discharged from the exhaust port b after it is successively connected to the evaporator 22, the processing area 8 and the processing air blower 1 through the pipeline. The regeneration air e is discharged from the exhaust port f to the atmosphere after it is successively connected to the front regeneration air blower 13, the sub phase-change condensation heat exchanger 42, the main phase-change condensation heat exchanger 41, the sub refrigerant gas cooler 62, the main refrigerant gas cooler 61, the regeneration area 10, a main evaporator 21 and the regeneration air blower 11.

Figure 7:
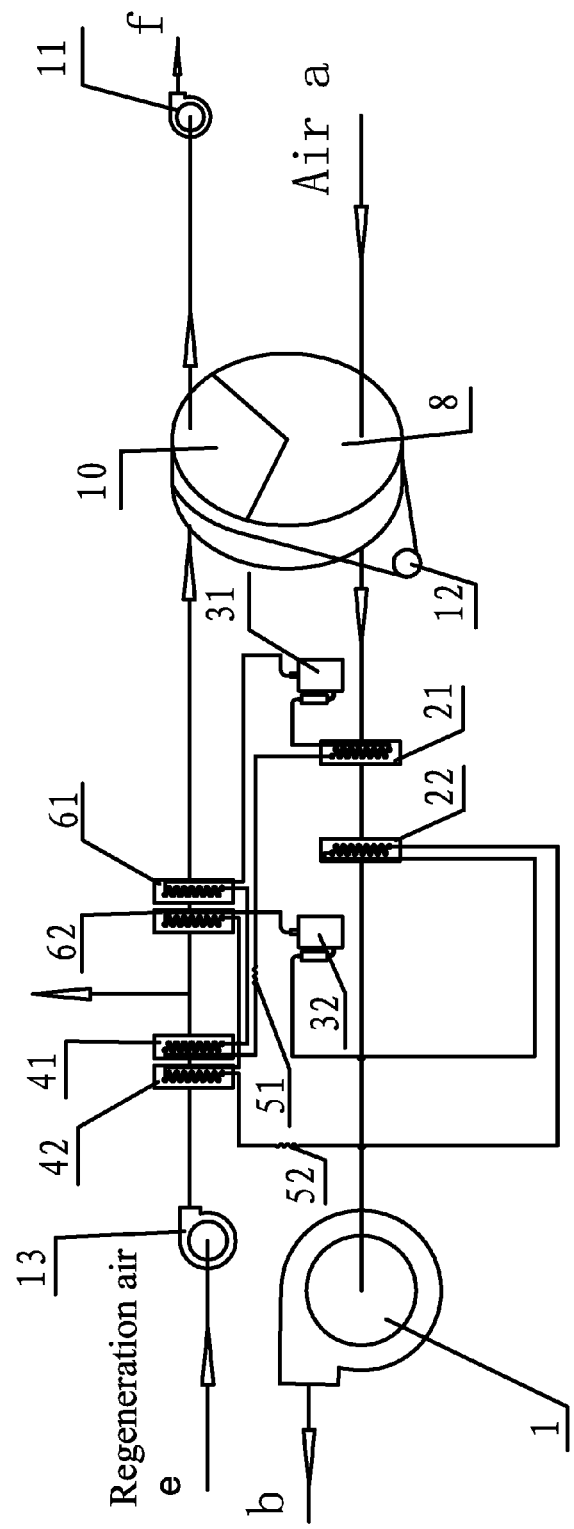
FIG. 7 is a seventh structural diagram of a coupled air-conditioning device based on FIG. 2.

As shown in FIG. 7, the air a needed to be processed is discharged from the exhaust port b after it is successively connected to the processing area 8, the main evaporator 21, the sub evaporator 22 and the processing air blower 1 through the pipeline. The regeneration air e is discharged from the exhaust port f to the atmosphere after it is successively connected to the front regeneration air blower 13, the sub phase-change condensation heat exchanger 42, the main phase-change condensation heat exchanger 41, the sub refrigerant gas cooler 62, the main refrigerant gas cooler 61, the regeneration area 10 and the regeneration air blower 11.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A coupled air-conditioning device, comprising a dehumidification system and a vapor compression-type refrigeration system which are connected through a pipeline, wherein
   the vapor compression-type refrigeration system is a closed circuit comprising an evaporator (2), a compressor (3), a condenser, and an expansion valve (5);
   the dehumidification system comprises a desiccant wheel with a regeneration area (10) and a processing area (8), a processing air blower (1), a regeneration air blower (11), and an electric motor (12) driving the desiccant wheel to rotate;
   the processing air blower (1) and the regeneration air blower (11) are provided with an exhaust port;
   the condenser comprises a phase-change condensation heat exchanger (4) and a refrigerant gas cooler (6); the refrigerant gas cooler (6) operates to cool an overheated refrigerant discharged from the compressor (3) into a saturated refrigerant in gas state, employing a structural form of a tube-fin type heat exchanger comprising a heat exchange tube and a fin piece; the refrigerant flows in the heat exchange tube while the air cooling the refrigerant flows outside of the heat exchange tube; the temperature of the heated air is higher than the saturated condensation temperature of the refrigerant; the phase-change condensation heat exchanger (4) condenses the refrigerant from gas state to liquid state and further cools the refrigerant to be under overcooled state in the phase-change condensation heat exchanger (4); and
   all the energy for the regeneration of the desiccant wheel comes from the energy released during vapor compression-type refrigeration process.

2. The device of claim 1, wherein the dehumidification system further comprises a front regeneration air blower (13); air needed to be processed is successively connected to the evaporator (2), the processing area (8), and the processing air blower (1) through the pipeline; regeneration air is successively connected to the front regeneration air blower (13), the phase-change condensation heat exchanger (4), the refrigerant gas cooler (6), the regeneration area (10), and the regeneration air blower (11); and the exhaust port is provided between the phase-change condensation heat exchanger (4) and the refrigerant gas cooler (6).

3. The device of claim 2, wherein the evaporator (2) is positioned between the processing area (8) and the processing air blower (1); and the air needed to be processed is successively connected to the processing area (8), the evaporator (2), and the processing air blower (1).

4. The device of claim 3, wherein a flow of the front regeneration air blower (13) is larger than that of the regeneration air blower (11); a heat-exchange area of the phase-change condensation heat exchanger (4) is larger than that of the refrigerant gas cooler (6); and the air volume of the front regeneration air blower (13) is adjusted and controlled by a temperature measurement and controlling device.

5. The device of claim 3, wherein the vapor compression-type refrigeration system comprises a main compression refrigeration system and a sub compression refrigeration system; and the exhaust port is provided between a main phase-change condensation heat exchanger (41) and a sub refrigerant gas cooler (62).

6. The device of claim 5, wherein the air needed to be processed is successively connected to a sub evaporator (22), the processing area (8), a main evaporator (21) and the processing air blower (1); and the regeneration air is successively connected to the front regeneration air blower (13), a sub phase-change condensation heat exchanger (42), the main phase-change condensation heat exchanger (41), the sub refrigerant gas cooler (62), a main refrigerant gas cooler (61), the regeneration area (10), and the regeneration air blower (11).

7. The device of claim 5, wherein the air needed to be processed is successively connected to a sub evaporator (22), the processing area (8) and the processing air blower (1); and the regeneration air is successively connected to the front regeneration air blower (13), a sub phase-change condensation heat exchanger (42), the main phase-change condensation heat exchanger (41), the sub refrigerant gas cooler (62), a main refrigerant gas cooler (61), the regeneration area (10), the main evaporator (21), and the regeneration air blower (11).

8. The device of claim 5, wherein the air needed to be processed is successively connected to the processing area (8), a main evaporator (21), a sub evaporator (22) and the processing air blower (1); and the regeneration air is successively connected to the front regeneration air blower (13), a sub phase-change condensation heat exchanger (42), a main phase-change condensation heat exchanger (41), the sub refrigerant gas cooler (62), a main refrigerant gas cooler (61), the regeneration area (10), and the regeneration air blower (11).

9. The device of claim 2, wherein a flow of the front regeneration air blower (13) is larger than that of the regeneration air blower (11); a heat-exchange area of the phase-change condensation heat exchanger (4) is larger than that of the refrigerant gas cooler (6); and the air volume of the front regeneration air blower (13) is adjusted and controlled by a temperature measurement and controlling device.

10. The device of claim 2, wherein the vapor compression-type refrigeration system comprises a main compression refrigeration system and a sub compression refrigeration system; and the exhaust port is provided between a main phase-change condensation heat exchanger (41) and a sub refrigerant gas cooler (62).

11. The device of claim 10, wherein the air needed to be processed is successively connected to a sub evaporator (22), the processing area (8), a main evaporator (21) and the processing air blower (1); and the regeneration air is successively connected to the front regeneration air blower (13), a sub phase-change condensation heat exchanger (42), the main phase-change condensation heat exchanger (41), the sub refrigerant gas cooler (62), a main refrigerant gas cooler (61), the regeneration area (10), and the regeneration air blower (11).

12. The device of claim 10, wherein the air needed to be processed is successively connected to a sub evaporator (22), the processing area (8) and the processing air blower (1); and the regeneration air is successively connected to the front regeneration air blower (13), a sub phase-change condensation heat exchanger (42), the main phase-change condensation heat exchanger (41), the sub refrigerant gas cooler (62), a main refrigerant gas cooler (61), the regeneration area (10), the main evaporator (21), and the regeneration air blower (11).

13. The device of claim 10, wherein the air needed to be processed is successively connected to the processing area (8), a main evaporator (21), a sub evaporator (22) and the processing air blower (1); and the regeneration air is successively connected to the front regeneration air blower (13), a sub phase-change condensation heat exchanger (42), a main phase-change condensation heat exchanger (41), the sub refrigerant gas cooler (62), a main refrigerant gas cooler (61), the regeneration area (10), and the regeneration air blower (11).

14. The device of claim 1, wherein the phase-change condensation heat exchanger (4) is a shell-tube type heat exchanger or plate-fin type heat exchanger; one side of the phase-change condensation heat exchanger (4) communicates with the refrigerant and the other side thereof communicates with cooled water; the dehumidification system also comprises a cooler (7); and the air needed to be processed is successively connected to the processing area (8), the cooler (7) and the processing air blower (1); and the regeneration air is successively connected to the refrigerant gas cooler (6), the regeneration area (10) and the regeneration air blower (11) through the pipeline.

15. The device of claim 14, wherein there are two desiccant wheels and two coolers in the system; two desiccant wheels connect in series, each desiccant wheel is driven by a respective electric motor; the air needed to be processed is successively connected to a processing area Level-1 (18), a cooler Level-1 (14), a processing area Level-2 (8), a cooler Level-2 (7), the evaporator (2) and the processing air blower (1) through the pipeline; the regeneration air flow through the gas cooler (6), and then be divided into two parts, one tributary is connected to the regeneration air blower Level-1 after flowing through the regeneration area Level-1 (17), and the other tributary communicates with the regeneration air blower Level-2 (11) after flowing through the regeneration area Level-2 (10).

* * * * *